(12) United States Patent
Yurman et al.

(10) Patent No.: US 10,890,210 B1
(45) Date of Patent: Jan. 12, 2021

(54) ARTICULATED SUPPORT ARM

(71) Applicant: Noga Engineering & Technology (2008) Ltd., Shlomi (IL)

(72) Inventors: Amit Yurman, Shavey-Zion (IL); Itay Roded, Kibbutz Cabri (IL); Eitan Yehud, Nahariya (IL); Shay Raviv, Kiryat Motzkin (IL)

(73) Assignee: Noga Engineering & Technology (2008) Ltd., Shlomi (IL)

( * ) Notice: Subject to any disclaimer, the term of this patent is extended or adjusted under 35 U.S.C. 154(b) by 11 days.

(21) Appl. No.: 16/458,064

(22) Filed: Jun. 30, 2019

(51) Int. Cl.
*F16M 11/02* (2006.01)
*F16C 11/10* (2006.01)
*F16M 13/02* (2006.01)

(52) U.S. Cl.
CPC ......... *F16C 11/106* (2013.01); *F16M 13/022* (2013.01); *F16M 2200/024* (2013.01); *F16M 2200/06* (2013.01)

(58) Field of Classification Search
CPC ......... F16C 11/106; F16C 11/10; F16C 11/06; F16C 11/0685; F16M 11/2078; F16B 2/02; Y10S 403/09; A61B 17/0206
See application file for complete search history.

(56) References Cited

U.S. PATENT DOCUMENTS

| 8,419,309 | B2 * | 4/2013 | Wimberley | F16M 11/14 403/90 |
| 9,885,383 | B2 * | 2/2018 | Wilson | F16C 11/10 |
| 2014/0169859 | A1 * | 6/2014 | Johnson | G01M 7/027 403/90 |
| 2016/0290387 | A1 * | 10/2016 | Richman | F16M 11/2078 |

* cited by examiner

*Primary Examiner* — Amy J. Sterling
(74) *Attorney, Agent, or Firm* — Pearl Cohen Zedek Latzer Baratz LLP (57) ABSTRACT

An articulated arm includes an arm segment, the segment attachable to at least one other segment of the arm; a ball-and-socket joint at a distal end of the arm segment, a ball of the joint including a plurality of indentations that are distributed over at least part of the surface of the ball; a rod that is slidable within the arm segment, the rod including at least one pin at its distal end, each pin of said at least one pin being configured to be inserted into an indentation of the plurality of indentations that is aligned with that pin; and an actuator mechanism that is configured to apply a distal force to slide the rod distally to insert each pin of said at least one pin into an indentation of the plurality of indentations.

6 Claims, 5 Drawing Sheets

ARTICULATED SUPPORT ARM

FIELD OF THE INVENTION

The present invention relates to support arms. More particularly, the present invention relates to an articulated support arm with an enhanced locking mechanism for supporting heavy loads.

BACKGROUND OF THE INVENTION

Articulated arms include two or more segments that are connected at flexible joints. Depending on the design, two segments that connect with one another at a joint may bend or rotate relative to one another.

In some cases, a user may unlock the joints to enable the joints to bend, and may lock the joints to prevent them from bending and to hold the segments in a desired configuration. In other cases, the joints may be subject to friction forces that are sufficient to hold the arm segments in a position until a sufficiently strong bending or rotating force is applied to the segments that are connected at the joint.

For example, a proximal end of the articulated arm may be anchored to a wall, floor, ceiling, or other fixed surface, or to a table, desk, or other heavy piece of furniture or object, such that the proximal end is fixed. When the joints are unlocked, the segments of the arm may be manipulated until a distal end of the arm is at a desired location. For example, the distal end of the arm may include structure for holding an object at the desired location. In some cases, when the distal end is at the desired location, the joints may be locked to prevent moving the held object.

SUMMARY OF THE INVENTION

There is thus provided, according to some embodiments of the invention, an articulated arm that includes an arm segment, the segment being attachable to at least one other segment of the arm; a ball-and-socket joint at a distal end of the arm segment, a ball of the joint including a plurality of indentations that are distributed over at least part of the surface of the ball; a rod that is slidable within the arm segment, the rod including at least one pin at its distal end, each pin of said at least one pin being configured to be inserted into an indentation of the plurality of indentations that is aligned with that pin; and an actuator mechanism that is configured to apply a distal force to slide the rod distally to insert each pin of said at least one pin into an indentation of the plurality of indentations.

According to some embodiments, the actuator mechanism is further configured to push the rod into the ball so as to press the ball between the rod and a socket of the ball-and-socket joint so as to generate a friction force to resist rotation of the ball within the socket.

According to some embodiments, said at least one pin comprises a single pin with a circular cross section, and each indentation of the plurality of indentations has a circular cross section.

According to some embodiments, said at least one pin comprises two pins.

According to some embodiments, each of the two pins has a circular cross section, and each indentation of the plurality of indentations has a circular cross section.

According to some embodiments, said at least one pin comprises a single pin with a regular polygonal cross section, and each indentation of the plurality of indentations has a matching regular polygonal cross section.

According to some embodiments, the regular polygonal cross section is hexagonal.

According to some embodiments, the actuator mechanism comprises a wedge that is movable to press against a sloped surface at a proximal end of an actuator rod to apply a distal force to the actuator rod.

According to some embodiments, the actuator mechanism further comprises a handle that is rotatable to move the wedge to apply the distal force.

According to some embodiments, the handle is located at a segment joint between the arm segment and another segment of said at least one other segment, and wherein the handle, when rotated, is further configured to prevent relative rotation between the arm segment and said another segment at the segment joint.

According to some embodiments, the handle, when rotated, is configured to cause teeth on the arm segment to engage teeth on said another arm segment at the segment joint to prevent the relative rotation.

According to some embodiments, rotation of the ball within a socket of the ball-and-socket joint is limited by an extension that extends from the ball.

According to some embodiments, said at least one pin comprises one or a plurality of floating pins each resiliently pressed.

According to some embodiments, each of said one or a plurality of floating pins is resiliently pressed by a spring.

According to some embodiments, there is provided an articulated arm that includes an arm segment, the segment being attachable to at least one other segment of the arm; a ball-and-socket joint at a distal end of the arm segment; a hydraulic chamber that is filled with a hydraulic fluid; a proximal piston that is slidable within the arm segment, a face of the proximal piston having a first area that is in contact with the hydraulic fluid at a proximal end of the hydraulic chamber; and a distal piston, a face of the distal piston having a second area that is in contact with the hydraulic fluid at a distal end of the hydraulic chamber, the distal piston configured, when pushed distally, to push a locking shoe against a ball of the ball-and-socket joint so as to apply a friction force to the ball that resists rotation of the ball, the second area being greater than the first area such that when an actuating force is applied to the proximal piston such that the face of the proximal piston applies pressure to the hydraulic fluid, the force that is applied by the hydraulic fluid to the distal piston is greater than the actuating force.

According to some embodiments, the face of the proximal piston and of the distal piston each includes a gasket to prevent seepage of the hydraulic fluid at the face.

According to some embodiments, the actuating force is applied to the proximal piston via an actuating rod that transmits the actuating force from an actuator mechanism to the proximal piston.

According to some embodiments, the actuator mechanism comprises a wedge that is movable to press against a sloped surface at a proximal end of the actuator rod to apply a distal force to the actuator rod.

According to some embodiments, the actuator mechanism further comprises a handle that is rotatable to move the wedge to apply the distal force.

According to some embodiments, the handle is located at a segment joint between the arm segment and another segment of said at least one other segment, and wherein the handle, when rotated, is further configured to prevent relative rotation between the arm segment and said another segment at the segment joint.

BRIEF DESCRIPTION OF THE DRAWINGS

In order for the present invention to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

An example of an enhanced lockable articulated arm includes at least one lockable ball-and-socket joint. Typically, a proximal end of the articulated arm is anchored to structure that is fixed to the ground or that is incorporated into or anchored to a building or an object that is sufficiently heavy such that the proximal end of the articulated arm does not appreciably move during typical or recommended use of the arm. The articulated arm includes two or more typically rigid segments that are connected to one another by one or more types of joints. For example, some of the joints may enable relative rotation between the segments along a single axis. A ball-and-socket joint may enable relative rotation along three axes within a limited range (typically smaller than a hemisphere). Combined manipulation of the component segments of the segments may manipulate a distal end of the articulated arm, typically configured to support an object, to a desired location within a range of locations. The range of locations is determined by the lengths of the segments, the rotational range of each of the joints, and by the location of anchored proximal end of the articulated arm. Locking the joints of the articulated arm may hold the distal end of the articulated arm, and thus and object that is held at the distal end, stably at the desired location. The enhancement of the ball-and-socket joints may enable stable support of heavier objects than would be supportable without the enhancement.

A ball of the ball-and-socket joint may be fitted with a connector for connecting the ball of the joint another segment of the articulated arm. For example, when the ball of the joint is connected to a distal segment of the articulated arm, the connector segment that is connected to the ball of the ball-and-socket joint at a distal end may include a holder for holding an object to be supported. As another example, the connector may include a male spigot that extends from the ball of the joint and that is insertable into a socket of another segment of the arm, or another type of connection to another segment of the arm.

A lockable ball-and-socket joint typically includes a concave locking shoe that, when the concave surface of the locking shoe is pressed against the ball, creates a friction force that prevents or inhibits rotation of the ball. When a large torque is applied to the ball, e.g., when the distal end of the articulated arm supports a heavy load, the applied torque may overcome the friction force and rotate the ball. In accordance with examples described herein, the mechanism for enhanced locking the ball-and-socket joint is provided with structure that enhances the strength of the locking mechanism. The enhancement may include enhancing the mechanical locking (e.g., by insertion of a pin into an indentation on a ball of the ball-and-socket joint) or enhancing the friction force (e.g., by using a hydraulic micro-piston to increase the friction force that is applied by the locking shoe). The enhancement of the friction force may increase the torque that must be applied in order to rotate the ball, thus increasing the weight of a load that may be supported by the articulated arm.

For example, enhancement of the locking mechanism may enable the articulated arm to support heavy objects that typically are difficult to support without such enhancement. Such heavy objects may include, for example, monitors, television sets, heavy light sources, or other potentially heavy equipment or machinery. The enhancement may also enable an articulated arm that is supporting a lighter object to resist accidental movement resulting from unintentional or accidental pushing or knocking, thereby greatly improving the capability of the arm to withstand dynamic or static loads.

An enhancement mechanism for the locking mechanism may be operated by the same locking structure that is operated to press locking shoe against the ball. A user may operate a locking actuator to cause the locking mechanism to engage the ball or disengage from the ball. For example, the locking actuator may include a rotatable locking handle. Rotation of the locking handle in one direction may tighten and lock the locking mechanism. Rotation of the locking handle in the opposite direction may loosen and unlock the locking mechanism. Typically, tightening the locking mechanism applies an axial force to an internal rod or piston to force the locking shoe against the ball.

In some cases, a rod or piston is configured to slide longitudinally along its axis within the interior of a segment of the articulated arm. The locking actuator, e.g., a locking handle, may be located at a proximal end of the segment. For example, rotation of a locking handle to tighten the locking mechanism may cause a wedge to slide perpendicularly to (e.g., laterally within the arm segment) a cooperating slanted surface at the proximal end of the rod or piston. The sliding of the wedge may push against the rod or piston, applying a force in the distal direction toward the ball-and-socket joint at the distal end of the segment. The distal force that is applied to the rod or piston may be mechanically, hydraulically, or otherwise transmitted to the locking shoe, thus pressing the locking shoe against the ball. For example, rotation of the locking handle may rotate an externally threaded screw shaft that is inserted through an internally threaded bore of the wedge or of a sleeve that is inserted into a bore of the wedge. Thus, rotation of the locking handle and screw shaft in one direction may cause the wedge to apply force to the rod toward the distal end of the segment. Rotation of the locking handle and screw shaft in the opposite direction may release the force that is applied to the rod. Alternatively or in addition, other mechanical, hydraulic, electromagnetic, or other mechanisms may be utilized to enable operation of a locking actuator to apply a pressing force to the locking shoe.

In some examples, the enhancement mechanism may include one or more pins that are insertable into indentations on the ball of the ball-and-socket joint. For example, the mechanism that presses the locking shoe against the ball may also press a pin into one of the indentations on the surface of the ball. In this example, a lockable orientation of the ball may be limited to those orientations in which the pin is aligned with one of the indentations. For example, spacing between neighboring indentations may be made as small as possible in order to enable maximum density of the indentations. A minimal spacing between adjacent indentations may be determined by a requirement that the wall between the adjacent indentations be sufficiently strong so as to withstand a torque that is exerted by a maximum supported load Similar conditions may limit a minimum diameter or maximum length of the pin.

When the pin has a circular cross section, insertion of the pin into an indentation may enhance the locking mechanism against rotation of the ball about an axis that is not parallel to a longitudinal axis of the pin. However, the pin may not enhance the locking mechanism against rotation of the ball about the axis of the pin. Introduction of asymmetry in the structure of the pins, the indentations, or both, may enable enhancement of the locking mechanism against rotation of the ball about the pin axis.

For example, the enhancement mechanism may include two or more pins that are insertable into a corresponding number of different indentations on the surface of the ball. In this example, the pins may be slanted relative to one another to match the curvature of the ball surface such that each pin is insertable into a radially oriented indentation. Also, in this example, the lockable orientations of the ball may be further limited to those orientations in which two pins are insertable into indentations of the ball.

In some embodiments of the invention, the enhancement mechanism may include floating pins, for example pins coupled to a spring. When in a released state, motion of the arm may be achieved, and, when in a locked state, the pins are pressed against the indentations on surface of the ball preventing motion.

In another example, the pin and the indentations may have matching cross sections that are not circularly symmetric. For example, the cross sections of the pin and indentations may be shaped as regular polygons. It may be noted that increasing the number of sides of the regular polygonal cross sections may increase the number of lockable orientations of the ball about the axis of the pin. It may be further noted that a hexagonal cross section may enable a maximally uniform distribution of the indentations on the surface of the ball.

As another example of an enhancement mechanism, the arm segment that includes the ball-and-socket joint may incorporate a hydraulic micro-piston. The hydraulic micro-piston may be configured to magnify the force that is applied to the locking shoe.

For example, operation of the locking actuator may apply a pushing force to a proximal piston. Pushing on the proximal piston may apply pressure to an incompressible hydraulic fluid (e.g., a hydraulic oil) or any other incompressible shape adaptive material that is enclosed within the segment between the proximal piston and a second, distal piston. The area of the face of the proximal piston that is in contact with the hydraulic fluid is smaller than the area of a face of the distal piston that is in contact with the hydraulic fluid.

The force that is applied by the hydraulic fluid to the distal piston will be greater than the force that is applied by the locking actuator to the proximal piston (e.g., by a magnification factor that is determined by the ratio of the area of the face of the distal piston to the area of the face of the proximal piston). The force that is applied to the distal piston may be transmitted to the locking shoe of the locking mechanism. Thus, the force that is applied to the locking shoe, and thus the friction force that resists rotation of the ball, is greater than the force that would be applied in the absence of the hydraulic micro-piston. It may be noted that a ball-and-socket joint with an enhancement mechanism that includes a hydraulic micro-piston, and which does not include a pin that is inserted into an indentation of the ball, may be locked in any orientation of the ball.

Figure 1:
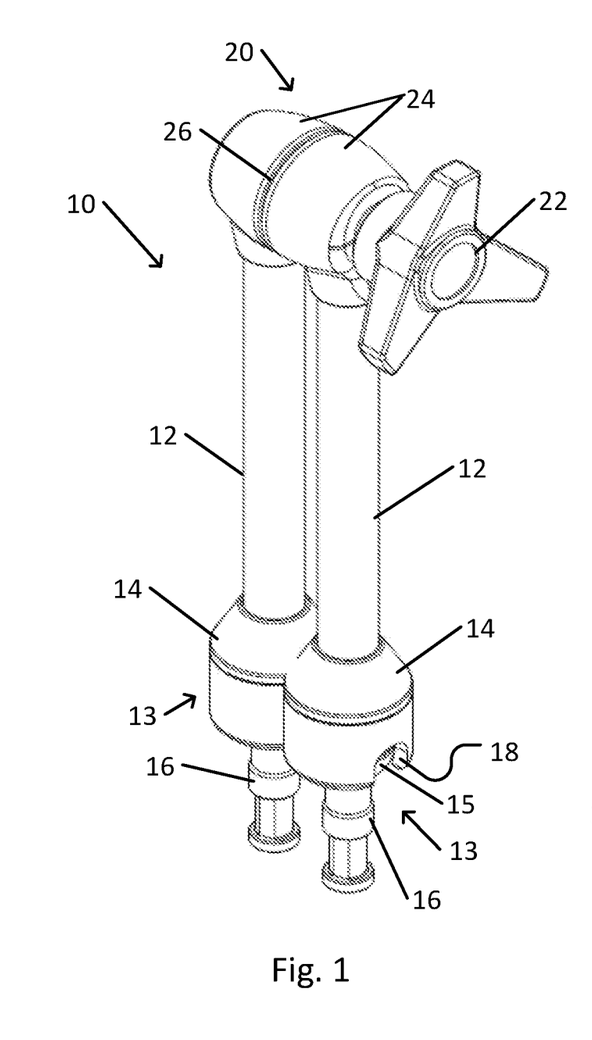
FIG. 1 schematically illustrates an articulated arm with a lockable ball-and-socket joint and enhanced locking, in accordance with an embodiment of the present invention.

FIG. 1 schematically illustrates an articulated arm with a lockable ball-and-socket joint and enhanced locking, in accordance with an embodiment of the present invention.

In the example, shown, articulated arm 10 includes two arm segments 12 that are joined at segment joint 20 at their proximal ends. A distal end of each arm segment 12 includes a ball-and-socket joint 13. Each ball-and-socket joint 13 includes a ball 15 that is rotatable within a socket 14.

In the example shown, a ball extension 16 extends from each ball 15. Ball extension 16 may include a spigot as shown (e.g., for connection to another arm segment 12 or to another extension component) or may include a holder for holding an object or another type of extension. Also, in the example shown, each socket 14 includes a notch 18. For example, each notch 18 may be configured to accommodate a ball extension 16 (e.g., during storage of articulated arm 10 or to reinforce ball-and-socket joint 13 when supporting a heavy object) when ball 15 is rotated such that ball extension 16 is inserted into notch 18.

In the example shown, the proximal end of each arm segment 12 includes a joint section 24 of segment joint 20. In segment joint 20, joint sections 24 are rotatable relative to one another about a single axis at section interface 26. In other examples, arm segments 12 may be joined by a ball-and-socket joint or by another type of joint.

In the example shown, segment joint 20 and ball-and-socket joints 13 may be locked or unlocked by rotation of locking handle 22.

Figure 2:
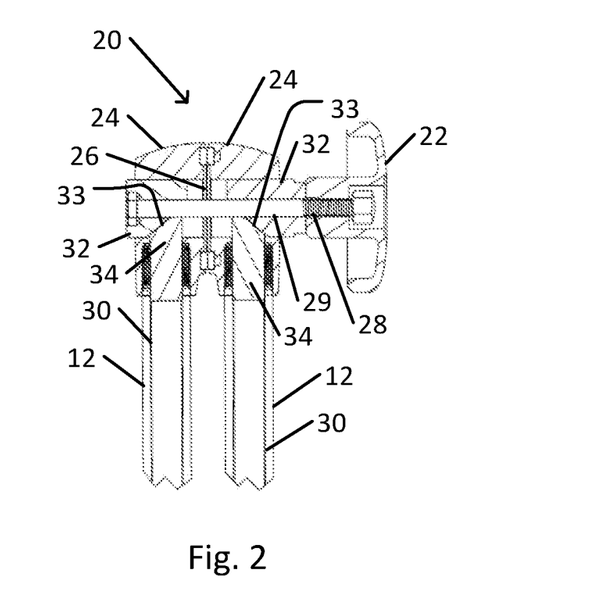
FIG. 2 schematically illustrates a cross section of an activation mechanism for locking the ball-and-socket joint of the articulated arm shown in FIG. 1.

FIG. 2 schematically illustrates a cross section of an activation mechanism for locking the ball-and-socket joint of the articulated arm shown in FIG. 1.

In the example of segment joint 20 that is shown, rotation of locking handle 22 rotates screw shaft 28. Screw shaft 28 is inserted into shaft sleeve 29, which extends through aligned bores of a wedged insert 32 of each joint section 24 and is anchored to the wedged insert 32 that is on the side of segment joint 20 opposite to locking handle 22. Shaft sleeve 29 includes interior bore that engages the exterior threading of screw shaft 28. Therefore, rotation of locking handle 22 in one direction may pull wedged inserts 32 toward one another, while rotation of locking handle 22 in the other direction allows for some space for wedged inserts 32 so as to relieve them from one another.

When wedged inserts 32 are pulled toward one another, the sloped surface of wedged insert 32 (e.g., with a slope of about 45°, as in the example shown) presses against sloped end 34 (e.g., also with a slope of about 45°) of activator rod 30 at sloped interface 33. When the sloped surface of wedged insert 32 presses against sloped end 34 at sloped interface 33, activator rod 30 is pushed longitudinally distally within arm segment 12 away from segment joint 20 and toward ball-and-socket joint 13. Distal pressing of activator rod 30 toward ball-and-socket joint 13 may activate an enhanced locking mechanism for locking ball-and-socket joint 13 and prevent ball 15 from rotating within socket 14. On the other hand, when wedged inserts 32 are separated from one another, the force that pushes distally on activator rod 30 may be reduced. Reduction of the distal force on activator rod 30 may release the enhanced locking mechanism, thus enabling rotation of ball 15 within socket 14.

In the example shown, the motion of wedged inserts 32 within joint section 24 is perpendicular to the direction of motion of activator rod 30 within arm segment 12. In other examples, the motion of a wedged insert, or of another component for distally pushing activator rod 30, may be in another direction relative to the direction of sliding of activator rod 30.

In the example shown, rotation of locking handle 22 and screw shaft 28 may also pull joint sections 24 toward one another at section interface 26. When joint sections 24 are pulled toward one another, rotation of one joint section 24, and thus of one arm segment 12, relative to the other may be prevented. For example, teeth on the surface of one joint section 24 at section interface 26 may engage teeth on the other joint section 24, thus preventing rotation of one joint section 24 relative to the other. In other examples, friction between joint sections 24 at section interface 26 or other types of engaging structure (e.g., pins in indentations, or other structure) may resist relative rotation between joint sections 24 at section interface 26. Rotation of locking handle 22 in the other direction may enable joint sections 24 to separate from one another at section interface 26, thus enabling rotation of one arm segment 12 relative to the other at segment joint 20.

In some examples, an enhanced locking mechanism may include a pin that is insertable into an indentation of a dimpled surface of a ball of ball-and-socket joint 13.

Figure 3A:
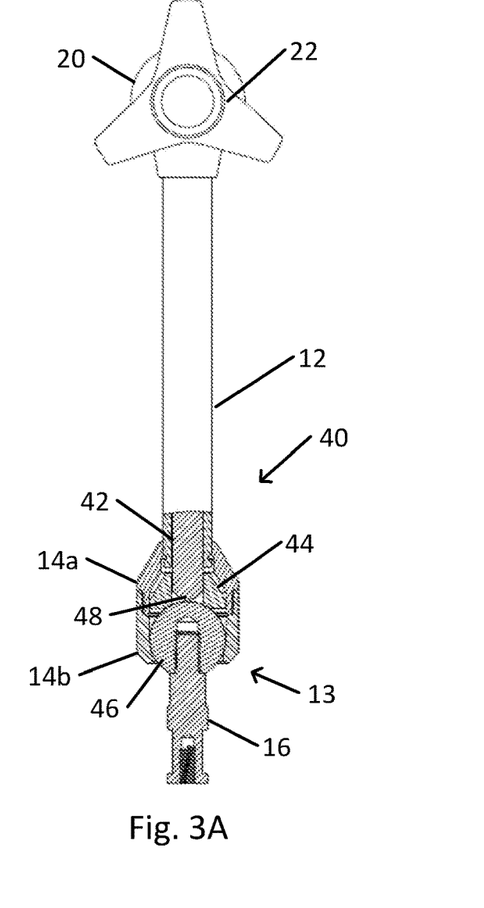
FIG. 3A schematically illustrates a cross section of an example of a dimpled ball mechanism for enhancing locking the ball-and-socket joint of the articulated arm shown in FIG. 1.
Figure 3B:
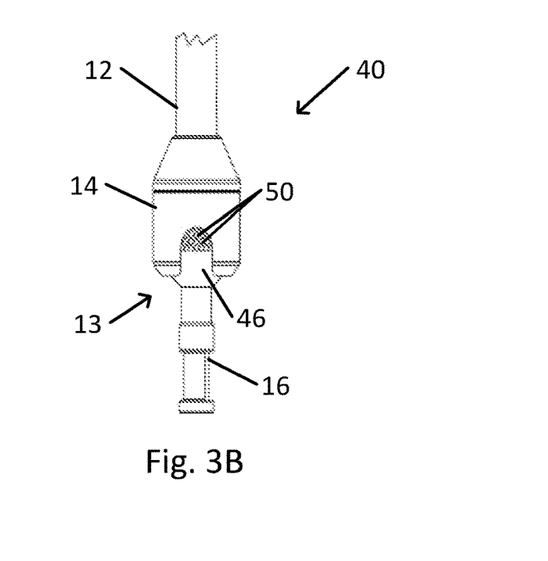
FIG. 3B schematically illustrates the ball-and-socket joint of the dimpled ball enhanced locking mechanism shown in FIG. 3A.
Figure 3C:
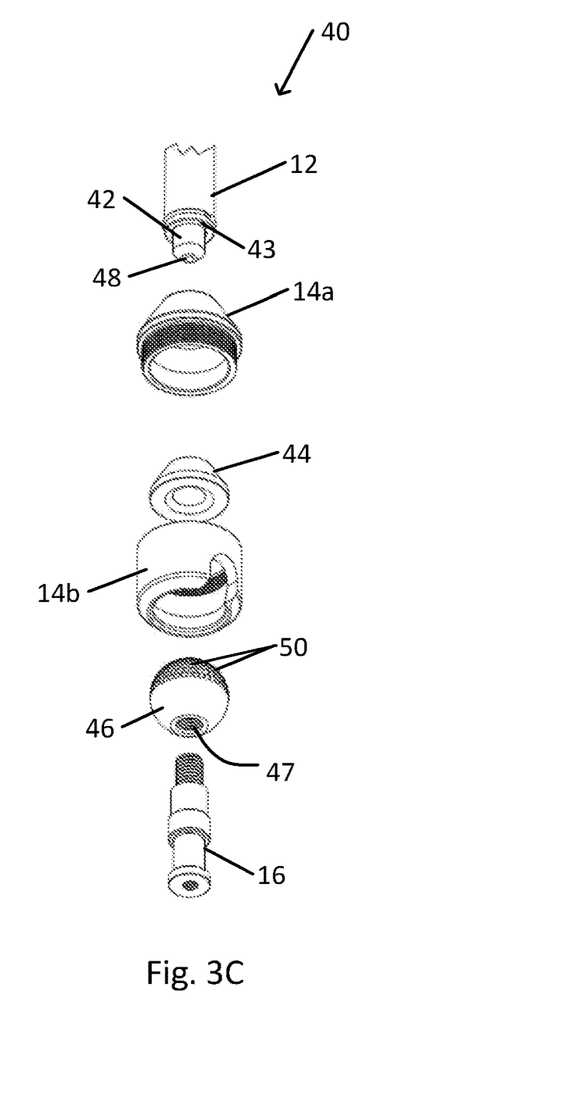
FIG. 3C is a schematic exploded view of the dimpled ball enhanced locking mechanism of the ball-and-socket joint shown in FIG. 3B.

FIG. 3A schematically illustrates a cross section of an example of a dimpled ball mechanism for enhancing locking the ball-and-socket joint of the articulated arm shown in FIG. 1. FIG. 3B schematically illustrates the ball-and-socket joint of the dimpled ball enhanced locking mechanism shown in FIG. 3A. FIG. 3C is a schematic exploded view of the dimpled ball enhanced locking mechanism of the ball-and-socket joint shown in FIG. 3B.

In dimpled ball locking mechanism 40, rod 42 is configured to slide longitudinally within arm segment 12. A distal end of rod 42 terminates in locking pin 48. In some examples, rod 42 is a distal end of actuator rod 30. In other examples, rod 42 is separate from actuator rod 30, whose proximal end may be pushed distally when a distal pushing force is applied to actuator rod 30. For example, a distal end of actuator rod 30 may push directly or indirectly (e.g., via one or more intervening rods, hydraulic pistons, or other force-transmitting components).

Dimpled ball 46 is held in place by socket 14 of ball-and-socket joint 13. When a ball extension 16 extends from dimpled ball 46, socket 14 may also limit the angular range of rotation of dimpled ball 46. In the example shown, dimpled ball 46 includes a threaded extension socket 47 into which threading of ball extension 16 (e.g., a spigot or a holder for holding an object) may be screwed for attachment to dimpled ball 46.

At least part of the surface of dimpled ball 46 is covered with indentations 50. Typically, the part of the surface of dimpled ball 46 that includes indentations 50 is a part of the surface that may be brought into contact with locking pin 48 when dimpled ball 46 is rotated within the range that is limited by socket 14.

When pushed distally, e.g., as a result of rotation of locking handle 22, the distal end of rod 42 may be pressed against dimpled ball 46. Thus, the pressing of the distal end of rod 42 may insert locking pin 48 into an indentation 50 of dimpled ball 46 that is currently oriented toward locking pin 48. The insertion of locking pin 48 into indentation 50 may cause locking pin 48 to engage indentation 50 so as to prevent any rotation of dimpled ball 46 that would entail rotation of the engaged indentation 50 away from locking pin 48. Thus, when locking pin 48 is inserted into indentation 50, dimpled ball 46 may be prevented by locking pin 48 from rotating about any axis (e.g., other than the axis that is defined by locking pin 48).

If locking pin 48 is not aligned with an indentation 50 when locking pin 48 is pressed against dimpled ball 46, dimpled ball 46 may require a (typically small) rotation in order to enable insertion of locking pin 48 into indentation 50. In some cases, locking pin 48, indentation 50, or both may be configured to facilitate self-alignment of an indentation 50 with locking pin 48. For example, a tip of locking pin 48 may have a conical or convex surface that facilitates sliding of the tip of locking pin 48 into a nearest indentation 50 when pressed against dimpled ball 46. Alternatively or in addition, an outer portion of a wall that separates between adjacent indentations 50 on dimpled ball 46 may be tapered or otherwise shape to facilitate sliding of locking pin 48 into a nearest indentation 50.

The lateral dimension (e.g., diameter or other lateral dimension) of each indentation 50, and thus of a locking pin 48 that is configured for insertion into indentation 50, may be selected in order to satisfy one or more considerations. For example, reducing the lateral dimensions of indentations 50 and of locking pin 48 may enable dimpled ball 46 to be locked in a greater number of orientations (e.g., greater density of indentations 50 per unit area of dimpled ball 46, and smaller angular spacing between possible orientations in which dimpled ball 46 may be locked) than would be possible with larger lateral dimensions. On the other hand, the lateral dimensions of locking pin 48, and the thickness of walls separating adjacent indentations 50, must be sufficient to withstand a maximum applied (to dimpled ball 46) torque for which ball-and-socket joint 13 is designed. Distance by which locking pin 48 extends from the distal end of rod 42 and a depth of each indentation 50 may also be selected to enable the locking mechanism to withstand the maximum applied torque.

In addition to prevention of rotation of dimpled ball 46 by engagement of indentation 50 by locking pin 48, the distal pushing of rod 42 may press dimpled ball 46 between rod 42 and an interior surface of socket 14 (e.g., of distal socket section 14b). Pressing of dimpled ball 46 against the surface of socket 14 may generate a friction force that further inhibits rotation of dimpled ball 46 within socket 14 (including inhibiting rotation about the axis of locking pin 48).

In the example shown, prior to assembly of ball-and-socket joint 13, socket 14 is separated into proximal socket section 14a and distal socket section 14b. Assembly of socket 14 may include insertion of dimpled ball 46 (and any attached extending structure, such as ball extension 16) into distal socket section 14b. After placement of dimpled ball 46 into distal socket section 14b, proximal socket section 14a may be attached to (e.g., screwed onto as in the example shown, or otherwise attached to) distal socket section 14b to enclose dimpled ball 46 within socket 14. In some cases, one or more spacers 44 may be inserted into socket 14. In the example shown, arm segment 12 includes threading 43 to enable attachment of arm segment 12 to ball-and-socket joint 13.

Figure 4A:
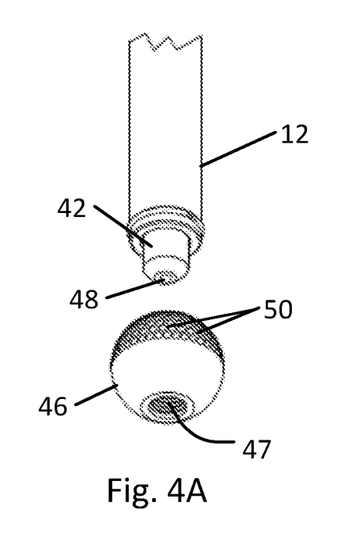
FIG. 4A schematically illustrates the dimpled ball locking enhancement mechanism shown in FIG. 3C where the locking pin has a circular cross section.

FIG. 4A schematically illustrates the dimpled ball locking enhancement mechanism shown in FIG. 3C where the locking pin has a circular cross section.

In the example shown, both locking pin 48 and indentations 50 have circular cross sections. Accordingly, when locking pin 48 has been inserted into and has engaged an indentation 50 of dimpled ball 46, the structure of locking pin 48 cannot prevent (e.g., other than by friction forces) rotation of indentation 50 and of dimpled ball 46 about the axis of locking pin 48.

In some examples, a dimpled ball locking enhancement mechanism may be configured to prevent all rotation of dimpled ball 46.

Figure 4B:
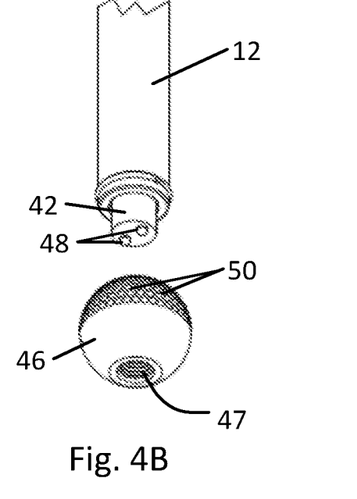
FIG. 4B schematically illustrates operation of a variant of the dimpled ball locking enhancement mechanism shown in FIG. 4A with two locking pins.

FIG. 4B schematically illustrates operation of a variant of the dimpled ball locking enhancement mechanism shown in FIG. 4A with two locking pins.

In the example shown, two locking pins 48 extend from the distal end of rod 42. When both locking pins 48 engage different indentations 50 of dimpled ball 46, the two locking pins 48 apply a torque that opposes rotation of dimpled ball 46 about any axis, including an axis parallel to that of rod 42.

The lengths of locking pins 48 (e.g., the distance that each locking pin 48 extends beyond the distal end of rod 42) may be sufficient to engage two indentations 50, taking into account the curvature of the surface of dimpled ball 46. In some cases, one or both of locking pins 48 may be slanted toward the other, or the distal end of rod 42 may be concave with each locking pin 48 extending normally to the surface, so as to match the orientation of the indentation 50 into which each is inserted.

In the example shown, locking pins 48 are arranged symmetrically on the distal end of rod 42. Other arrangements are possible. For example, one locking pin 48 may extend from the center of the distal end of rod 42, while the other locking pin 48 extends from a point between the center and the outer perimeter of the distal end. In some cases, more than two locking pins 48 may extend from rod 42.

Engaging two or more locking pins 48 with indentations 50 may further (e.g., over a single locking pin 48) limit the number of orientations of dimpled ball 46 in which dimpled ball 46 may be locked. However, use of two or more locking pins 48 may provide additional strength to the forces that resist rotation of dimpled ball 46, such that the lateral dimensions of locking pins 48 and indentations 50 may be reduced. As a result, the density of the distribution of indentations 50 on the surface of dimpled ball 46 may be increased, thus increasing the number of lockable orientations of dimpled ball 46.

Figure 4C:
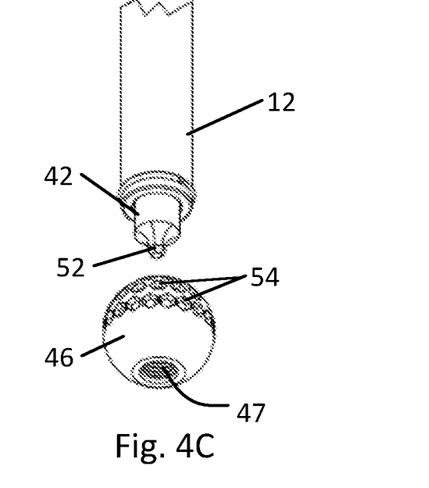
FIG. 4C schematically illustrates operation of a variant of the dimpled ball locking enhancement mechanism shown in FIG. 4A with a polygonal locking pin.

FIG. 4C schematically illustrates operation of a variant of the dimpled ball locking enhancement mechanism shown in FIG. 4A with a polygonal locking pin.

When a locking pin 52 with a regular polygonal cross section is inserted into an indentation 54 having a similar regular polygonal shape (e.g., with lateral dimension sufficiently large to enable insertion of locking pin 52, but sufficiently small to prevent rotation of locking pin 52), the limited and noncircular rotational symmetry prevents rotation of dimpled ball 46 about the axis of locking pin 52.

In the example shown, locking pin 52 has a hexagonal cross section. Similarly, each indentation 54 has a similar hexagonal cross section.

It may be noted that increasing the number of sides or the polygonal shape over six may increase the number of orientations of dimpled ball 46 in which locking pin 52 is aligned with, and insertable into, an indentation 54. Thus, increasing the number of sides may increase the number of orientations of dimpled ball 46 in which dimpled ball 46 may be locked. Reducing the number of sides to less than six may, on the other hand, reduce the number of orientations in which locking pin 52 may align with indentation 54 to lock the orientation of dimpled ball 46. Furthermore, it may be noted that a hexagonal shape may enable a denser distribution of indentations 54 on dimpled ball 46 than would regular polygons with more than six sides.

Incorporation of dimpled ball locking mechanism 40 into an arm segment 12 of an articulated arm 10 may enable articulated arm 10 to support a heavier load than would be possible without an enhanced locking mechanism. The effect of insertion of one or more locking pins 48 or 52 into indentations 50 or 54 of dimpled ball 46 of dimpled ball locking mechanism 40 is to prevent rotation of dimpled ball 46 within ball-and-socket joint 13. This prevention of rotation may enable an articulated arm 10 that incorporates dimpled ball locking mechanism 40 to hold in place a heavier object that might otherwise apply torques that could overcome unenhanced friction forces that are intended to prevent rotation of ball-and-socket joint 13.

Alternatively or in addition to an enhanced locking mechanism that includes locking pins 48 or 52 and a dimpled ball 46 with indentations 50 or 54, other mechanisms may be provided to enhance locking of a ball-and-socket joint 13.

Figure 5A:
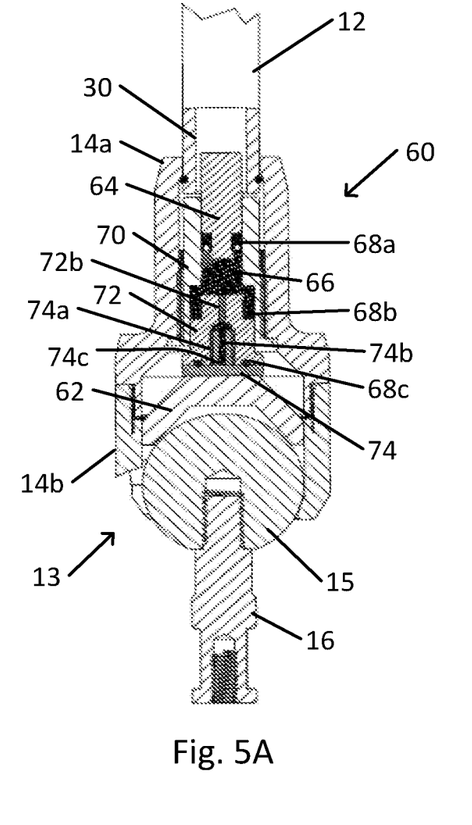
FIG. 5A is a schematic cross section of an example of a hydraulic micro-piston enhancement mechanism for locking the ball-and-socket joint of the articulated arm shown in FIG. 1.
Figure 5B:
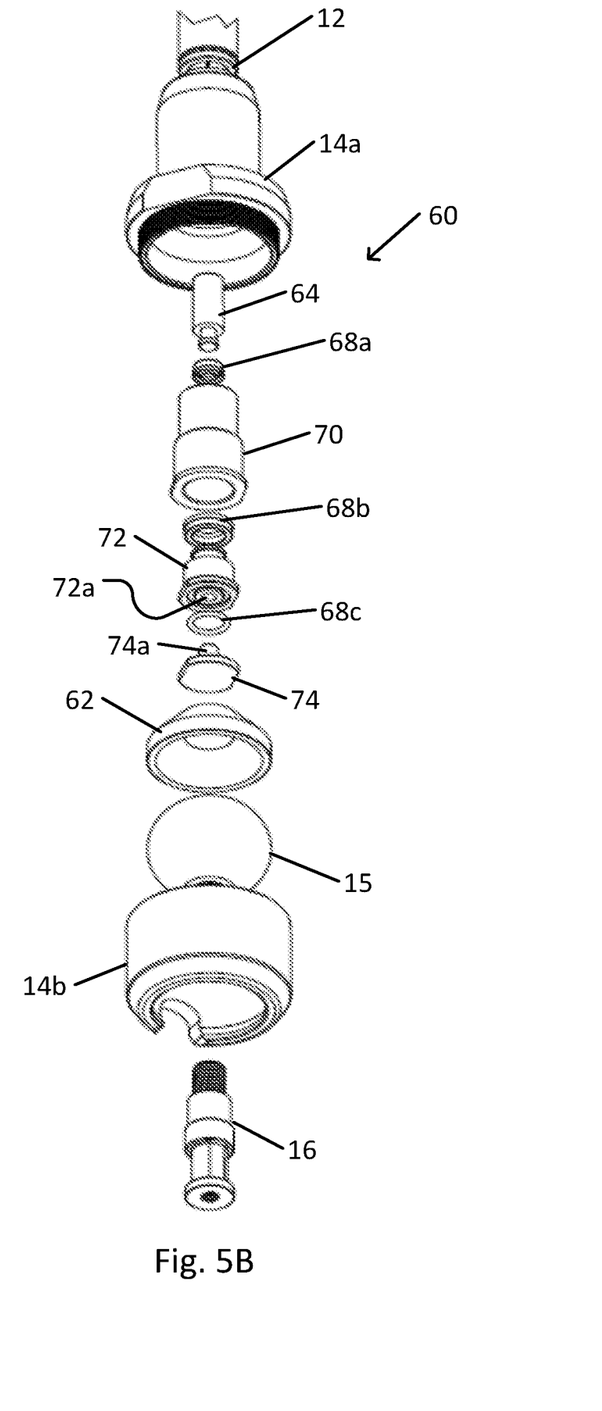
FIG. 5B is a schematic exploded view of the hydraulic micro-piston enhancement mechanism shown in FIG. 5A.

FIG. 5A is a schematic cross section of an example of a hydraulic micro-piston enhancement mechanism for locking the ball-and-socket joint of the articulated arm shown in FIG. 1. FIG. 5B is a schematic exploded view of the hydraulic micro-piston enhancement mechanism shown in FIG. 5A.

In hydraulic locking mechanism 60, hydraulic forces are utilized to enhance a distal force that is exerted, e.g., by rotation of a locking handle 22 or otherwise. For example, a distal force may be applied to activator rod 30 in order to lock ball-and-socket joint 13.

In the example shown, when activator rod 30 is pushed distally by an actuating pushing force within arm segment 12, the pushing force is transmitted to proximal micro-piston segment 64. The pushing force pushes proximal micro-piston segment 64 into hydraulic fluid chamber 70. When assembled to form hydraulic locking mechanism 60, hydraulic fluid chamber 70 is filled with hydraulic fluid 66, typically a hydraulic oil. Proximal chamber gasket 68a is configured to prevent seepage of hydraulic fluid 66 between the interior walls of hydraulic fluid chamber 70 and the exterior walls of proximal micro-piston segment 64. Accordingly, the force that is applied by proximal micro-piston segment 64 to hydraulic fluid 66 is transmitted as pressure by hydraulic fluid 66. For example, the pressure that is applied to hydraulic fluid 66 may be calculated as the actuating force that is applied by activator rod 30 to proximal micro-piston segment 64 and to proximal chamber gasket 68a, divided by the surface areas of a face of proximal micro-piston segment 64 and of proximal chamber gasket 68a that are in contact with hydraulic fluid 66.

The pressure of hydraulic fluid 66 is applied to distal micro-piston segment 72. Distal chamber gasket 68b is configured to prevent seepage of hydraulic fluid 66 between the interior walls of hydraulic fluid chamber 70 and the exterior walls of distal micro-piston segment 72. Accordingly, the distal pushing force that is applied to distal micro-piston segment 72 by hydraulic fluid 66 is the pressure of hydraulic fluid 66 multiplied by the surface area of a face of distal micro-piston segment 72 and of distal chamber gasket 68b that are in contact with hydraulic fluid 66.

In the example shown, the surface area of the face of distal micro-piston segment 72 that is in contact with hydraulic fluid 66 is greater than the surface area of the face of proximal micro-piston segment 64 that is contact with hydraulic fluid 66. Accordingly, the force that is applied to distal micro-piston segment 72 is greater that the actuating force that was originally applied to activator rod 30 and was transmitted to proximal micro-piston segment 64 by a factor that is approximately equal to the ratio of the surface area of the face of distal micro-piston segment 72 to the surface area of the face of proximal micro-piston segment 64.

In the example shown, the force ratio as determined by the ratio of the surface area of the face of distal micro-piston segment 72 to the surface area of the face of proximal micro-piston segment 64 is approximately 2.6. In other examples, the surface area ratio may be greater than 2.6 or less than 2.6. It may be noted that the distance that is traveled by proximal micro-piston segment 64 is greater than the distance traveled by distal micro-piston segment 72 by a distance ratio that is equal to the force ratio.

The distal pushing force that is applied to distal micro-piston segment 72 via hydraulic fluid 66 is applied to shoe actuator 74. When distally pushed, shoe actuator 74 presses against locking shoe 62. Locking shoe 62 is enclosed within socket 14 of ball-and-socket joint 13 between proximal socket section 14a and ball 15. When locking shoe 62 is distally pushed by shoe actuator 74, locking shoe 62 is pressed into ball 15. As a result of the pressing of locking shoe 62 into ball 15, ball 15 is pressed between locking shoe 62 and distal socket section 14b. The resulting friction force may be sufficient to prevent ball 15 from rotating within ball-and-socket joint 13.

In the example shown, shoe actuator 74 is an initially separate component that is assembled into distal micro-piston segment 72. This assembly of initially separate distal micro-piston segment 72 and shoe actuator 74 may facilitate elimination of air pockets or bubbles in hydraulic fluid 66 during assembly of hydraulic locking mechanism 60. For example, during assembly of hydraulic locking mechanism 60, a proximal end of arm segment 12 may be oriented downward. After placement of proximal micro-piston segment 64 and proximal chamber gasket 68a inside of hydraulic fluid chamber 70, hydraulic fluid chamber 70 may be filled with hydraulic fluid 66. When distal micro-piston segment 72 and distal chamber gasket 68b are placed within hydraulic fluid chamber 70, hydraulic fluid 66 may fill channel 72b and threaded bore 72a. When threaded stem 74a of shoe actuator 74 is screwed into threaded bore 72a, hydraulic fluid 66 may enter channel 74b of threaded stem 74a and exit via one or more bleeder openings 74c at the base of threaded stem 74a. Actuator gasket 68c is configured to prevent hydraulic fluid 66 from leaking outward between distal micro-piston segment 72 and shoe actuator 74. In other examples, distal micro-piston segment 72 and shoe actuator 74 may be formed as a single piece, and other techniques may be applied to prevent occurrence of trapped air within hydraulic fluid 66.

In the example shown, the motion of proximal micro-piston segment 64 and of distal micro-piston segment 72 is collinear. In other examples, a hydraulic fluid chamber may include a bend. Since hydraulic forces are transmitted by pressure of hydraulic fluid 66, a force may be transmitted from proximal micro-piston segment 64 to distal micro-piston segment 72 regardless of any bend angle between them. Therefore, incorporation of a hydraulic locking mechanism into an arm segment may allow the arm segment to include a bend.

Incorporation of hydraulic locking mechanism 60 into an arm segment 12 of an articulated arm 10 may enable articulated arm 10 to support a heavier load than would be possible without an enhanced locking mechanism. The effect of hydraulic locking mechanism 60 is to enable application of a greater friction force on ball 15 by a locking actuator (e.g., locking handle 22) than would be possible otherwise using the same locking actuator. It may be noted that hydraulic locking mechanism 60 may enable locking of ball-and-socket joint 13 in any orientation of ball 15, and thus of ball extension 16. Thus, an articulated arm 10 that incorporates hydraulic locking mechanism 60 may enable accurate manipulation of a supported object to any position within a range of articulated arm 10 and may enable locking articulated arm 10 to support the object at the selected position.

It may be noted that, in some cases, an arm segment 12 may include a combined enhanced locking mechanism that includes both pins and dimpled balls, and hydraulic enhancement of friction forces. In some cases, different arm segments 12 of an articulated arm 10 may incorporate different enhanced locking mechanisms. For example, one arm segment 12 may include hydraulic locking mechanism 60 while another includes dimpled ball locking mechanism 40. One or more arm segments 12 may include no locking enhancement (e.g., where that arm segment 12 does not include a ball-and-socket joint 13, or where enhancement of a ball-and-socket joint 13 is not deemed to be necessary).

Figure 6:
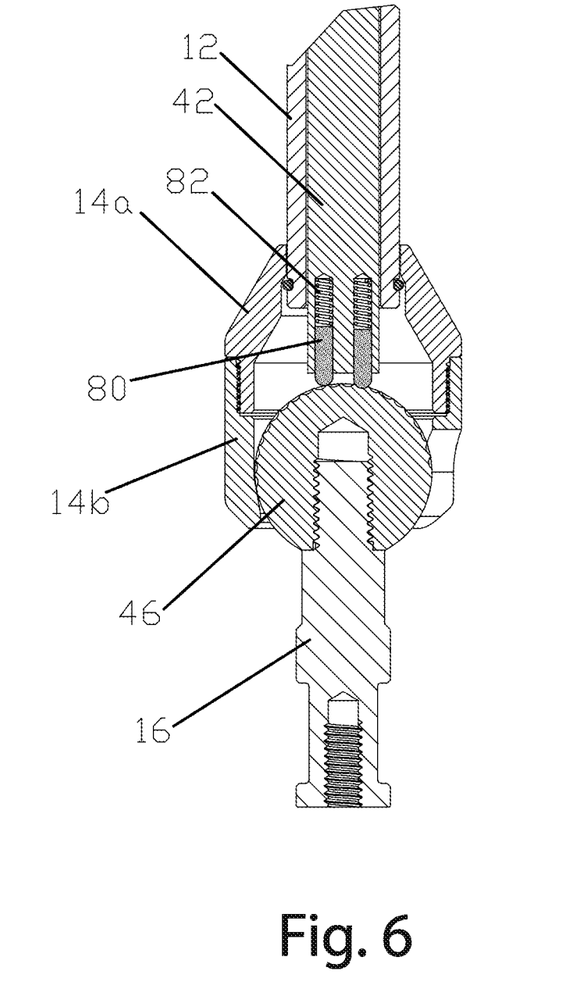
FIG. 6 schematically illustrates a cross section of an example of a two floating pins mechanism for enhancing locking the ball-and-socket joint of the articulated arm shown in FIG. 1.

FIG. 6 schematically illustrates a cross section of an example of a two floating pins mechanism for enhancing locking the ball-and-socket joint of the articulated arm shown in FIG. 1. In this embodiment, one or a plurality of floating pins 80 may be used, resiliently pressed (e.g., by spring 82) onto the surface of dimpled ball 46.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. An articulated arm comprising:
   an arm segment, the segment attachable to at least one other segment of the arm;
   a ball-and-socket joint at a distal end of the arm segment;
   a hydraulic chamber that is filled with a hydraulic fluid;
   a proximal piston that is slidable within the arm segment, a face of the proximal piston having a first area that is in contact with the hydraulic fluid at a proximal end of the hydraulic chamber; and
   a distal piston, a face of the distal piston having a second area that is in contact with the hydraulic fluid at a distal end of the hydraulic chamber, the distal piston being configured, when pushed distally, to push a locking shoe against a ball of the ball-and-socket joint so as to apply a friction force to the ball that resists rotation of the ball, the second area being greater than the first area such that when an actuating force is applied to the proximal piston such that the face of the proximal piston applies pressure to the hydraulic fluid, the force that is applied by the hydraulic fluid to the distal piston is greater than the actuating force.

2. The arm of claim 1, wherein the face of the proximal piston and of the distal piston each includes a gasket to prevent seepage of the hydraulic fluid at the face.

3. The arm of claim 1, wherein the actuating force is applied to the proximal piston via an actuating rod that transmits the actuating force from an actuator mechanism to the proximal piston.

4. The arm of claim 3, wherein the actuator mechanism comprises a wedge that is movable to press against a sloped surface at a proximal end of the actuator rod to apply a distal force to the actuator rod.

5. The arm of claim 4, wherein the actuator mechanism further comprises a handle that is rotatable to move the wedge to apply the distal force.

6. The arm of claim 5, wherein the handle is located at a segment joint between the arm segment and another segment of said at least one other segment, and wherein the handle, when rotated, is further configured to prevent relative rotation between the arm segment and said another segment at the segment joint.

* * * * *